INVENTOR.
WILLIAM GROGG, JR.
BY
ATTORNEYS

Feb. 18, 1958      W. GROGG, JR      2,823,786
WAFFLE TRANSFER MECHANISM

Filed Jan. 2, 1957      6 Sheets-Sheet 3

INVENTOR.
WILLIAM GROGG, JR.

BY

ATTORNEYS

United States Patent Office 2,823,786
Patented Feb. 18, 1958

2,823,786

WAFFLE TRANSFER MECHANISM

William Grogg, Jr., Stow, Ohio, assignor to The Quaker Oats Company, Chicago, Ill., a corporation of New Jersey Application January 2, 1957, Serial No. 632,122

16 Claims. (Cl. 198—20)

The invention relates generally to apparatus for automatically baking battercakes and the like continuously, and more particularly to mechanism for lifting cooked battercakes such as waffles successively from a series of griddles on a moving conveyor and transferring the cooked cakes to another conveyor having associated mechanism for trimming the edges of the cakes. The present transfer mechanism is particularly adapted for lifting and transferring cooked waffles from griddles having the characteristic embossed waffle surface.

In the automatic baking of waffle cakes in large quantities for quick freezing, a machine employing an endless conveyor carrying series of matching griddles passing through charging, cooking, and cake removing zones has been found desirable from the standpoint of minimum space requirements, quantity production, automatic operation and control of amount of cooking. However, the automatic removal of the cooked cakes without breakage from successive griddles is a difficult problem which is especially aggravated in the case of waffle cakes, because the characteristic embossed checkerboard design of the griddles makes it difficult to remove the cakes intact by means of a spatula and the like.

Moreover, waffle cakes which are to be frozen and packaged require trimming of the flash produced at the parting line between the complementary or matching upper and lower griddles, and thus the cooked cakes must be carefully transferred without breakage from their griddles to a supporting means such as a conveyor belt where the edges of the cakes are trimmed.

The present invention provides novel and improved mechanism including a transfer carriage which swings down over successive waffle cakes and gently lifts them by vacuum from successive moving griddles as the griddles are opened and arrive at an unloading station, and then automatically transfers each cake without any breakage or damage thereto to a different conveyor which carries the cakes to suitable mechanism for trimming their edges.

Other objects include the provision of an improved transfer mechanism which is easily coordinated with the movement of the griddles, which is entirely automatic in operation, which is compact and efficient, and which removes and handles a succession of cooked waffles without breaking or damaging them, and without stopping the griddle conveyor.

These and other objects are accomplished by the improved mechanism comprising the present invention, a preferred embodiment of which is shown by way of example in the accompanying drawings and described in detail herein. Various modifications and changes in details of construction are included within the scope of the invention as defined by the appended claims.

Referring to the drawings.

Figure 1:
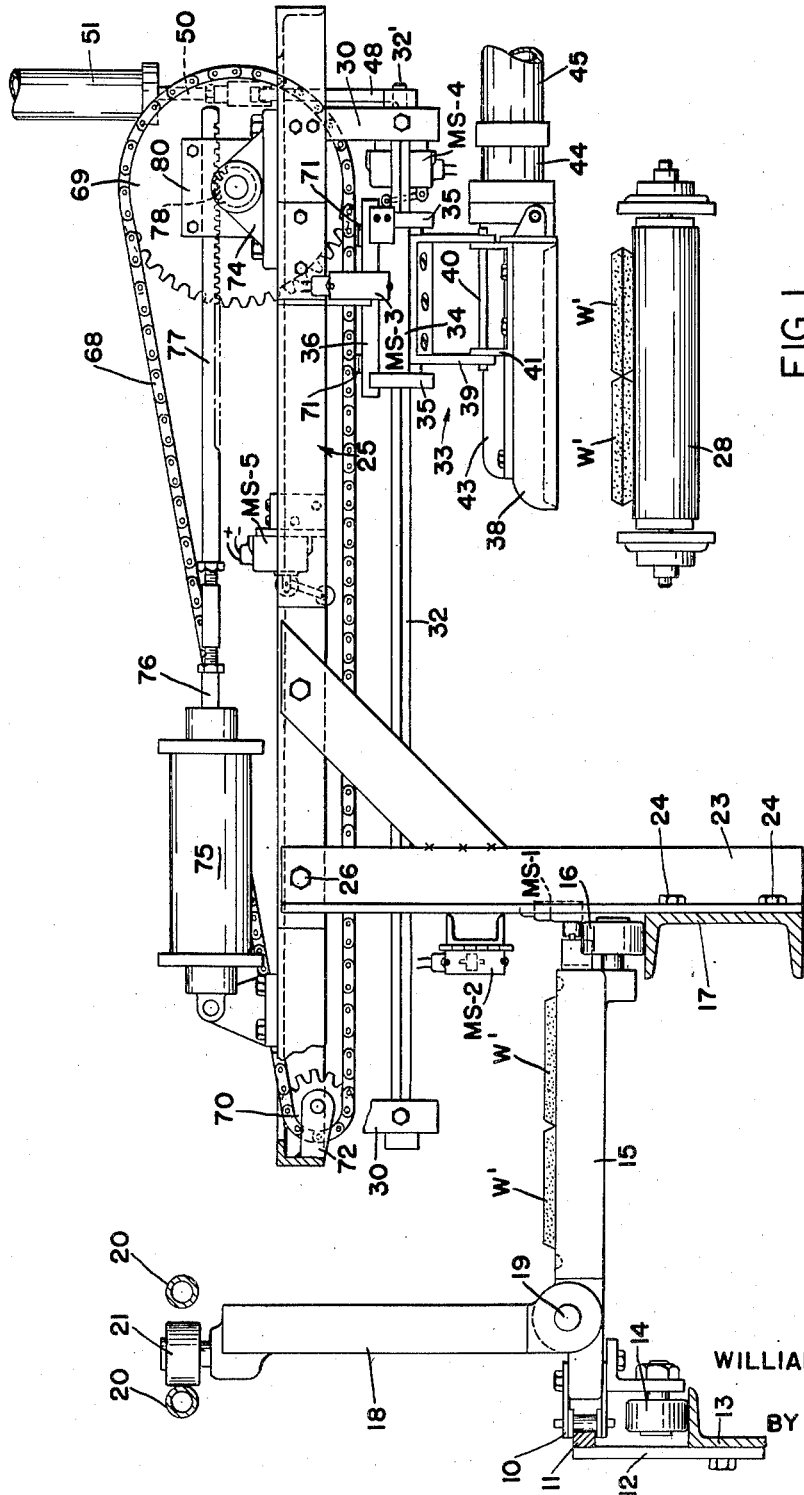
Fig. 1 is a side elevation of the improved waffle cake transfer mechanism associated with a griddle conveyor and showing the transfer carriage positioned over a laterally spaced belt conveyor which moves the transferred cakes to suitable trimming means.
Figure 2:
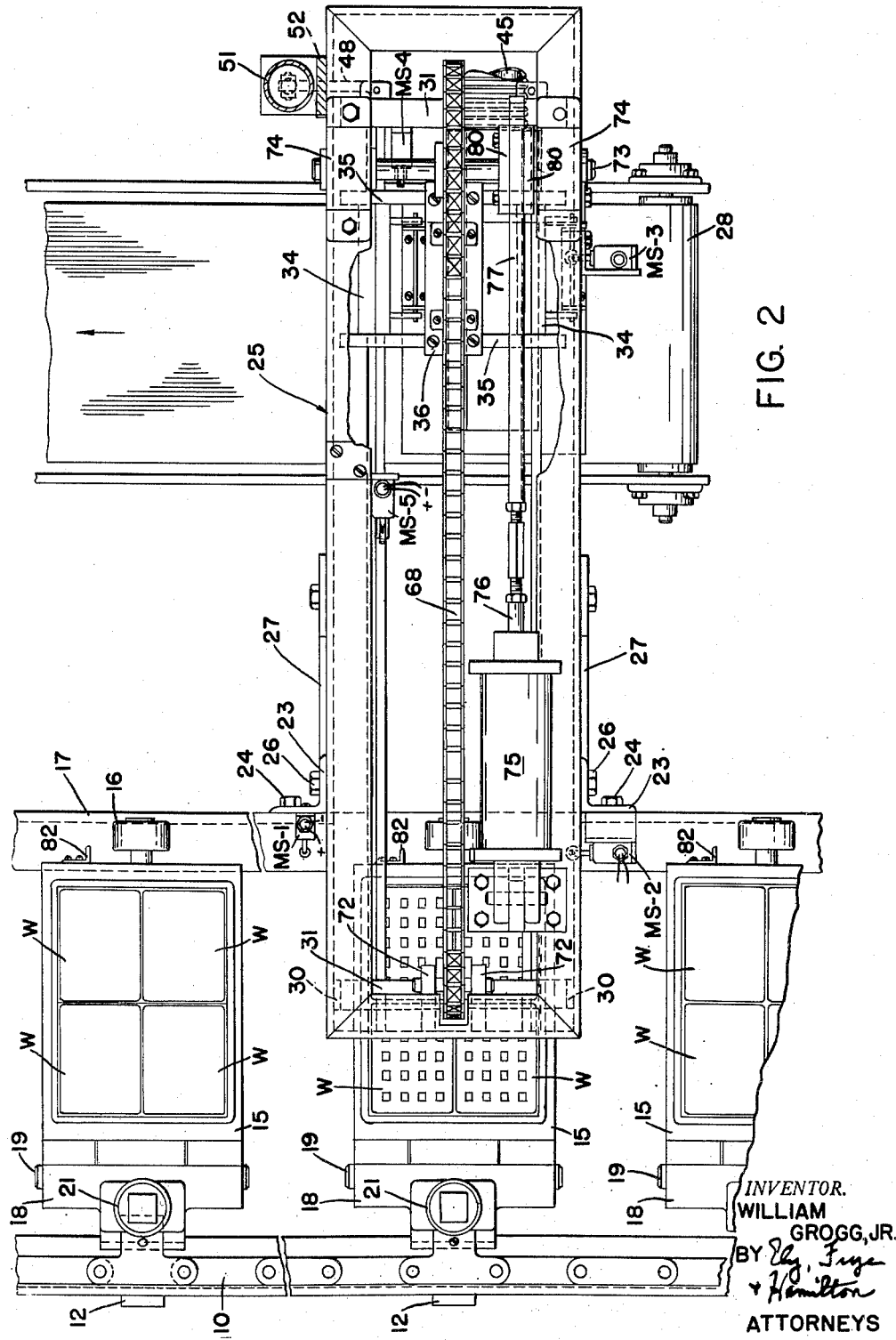
Fig. 2 is a plan elevation of Fig. 1.
Figure 3:
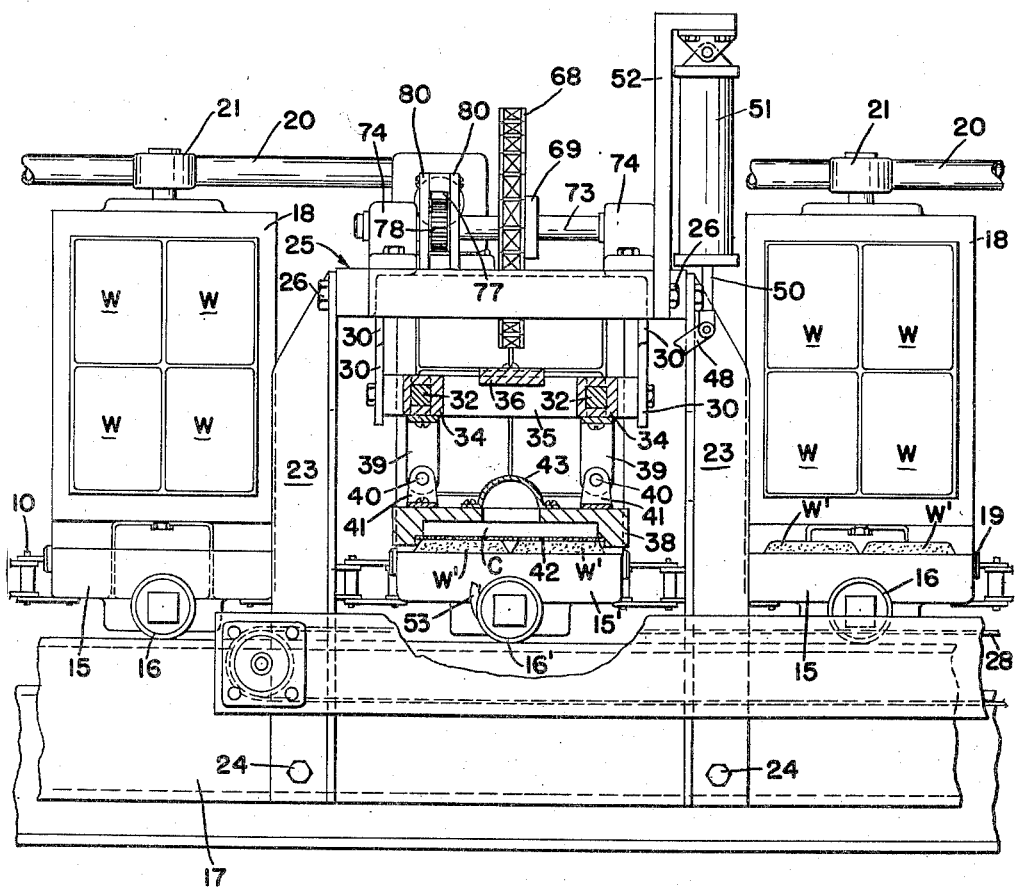
Fig. 3 is an end elevation, partly broken away and in section, showing the transfer carriage swung down in the act of lifting a waffle cake from a griddle.

Referring first to Figs. 1–3, the novel transfer mechanism is connected to the griddle conveyor of a continuous waffle cake cooking apparatus at a station where the upper griddles have been swung upwardly to expose the cooked cakes on the matching lower griddles. The griddles are advanced continuously by any suitable means, at a speed causing the successive griddles to arrive at the unloading station at desired time intervals between which the carriage transfers the cake from one griddle to the trimmer conveyor and then returns to position for picking up the cake from the next successive griddle.

The griddle conveyor preferably includes an endless roller chain 10 attached at intervals to the griddles and running on a rail 11 mounted on the upper ends of brackets 12 attached to an inner channel 13. The upper leg of channel 13 forms a track for the rollers 14 supporting the inner side of each lower waffle griddle 15. The outer side of each lower griddle 15 carries a roller 16 which is supported on a laterally spaced outer channel 17.

Each matching upper griddle 18 is hinged or pivoted by a pin 19 to the inner side of the lower griddle, and the upper griddles are preferably swung upwardly to open position by a suitable cam track comprising rails 20 (Fig. 1) engaging rollers 21 on the outer side of each upper griddle 18.

As shown, each upper and lower griddle has matching indentations forming the characteristic embossed waffle design, and each plate preferably has four sections W forming a cake having four waffle sections W' which are connected together along their adjoining edges, and subsequently cut apart by suitable trimming and severing saws into four separate waffle cakes.

The waffle cake cooking apparatus, and the trimming and severing machanism, per se form no part of the present invention.

The waffle transfer mechanism is carried on a frame supported on two upright angles 23 secured at the lower ends to the outer face of channel 17 by bolts 24. The angles 23 project upwardly from channel 17 and an elongated rectangular frame 25 made up of angles is mounted in a horizontal position between the upper ends of angles 23 by bolts 26. Angular braces 27 extending from the angles 23 are also bolted to the sides of the frame to stabilize it in horizontal position.

The inner end of the frame 25 overhangs the griddle conveyor and terminates over the central part of each lower griddle plate 15 as it pauses momentarily at the unloading station. The frame projects laterally outward from the griddle conveyor and the outer end of the frame overhangs and extends substantially beyond a belt conveyor 28 (Figs. 1 and 2) extending parallel to the griddle conveyor and adapted for carrying waffle cakes deposited thereon to the severing and trimming mechanism (not shown).

Adjacent each end of the frame 25, a pair of supporting bars 30 depends vertically from opposite sides thereof and the lower ends of each pair are connected by a horizontal bar 31 extending transversely of the frame. In these transverse bars 31 are journaled the ends of two parallel horizontal guide rods 32 extending longitudinally of the frame, the entire lengths of the guide rods between the transverse bars being square in cross section. The transfer carriage indicated generally at 33 is slidably supported on the guide rods 32.

The upper part of the carriage 33 comprises a frame having a pair of square blocks 34 slidable but not rotatable on the square guide rods 32. The ends of blocks 34 rotatably abut transverse bars 35 in which the guide rods are rotatable, and the bars 35 are connected together by a longitudinal bar 36 secured to their top edges midway of the blocks 34.

Referring to Figs. 1 and 3, the carriage has a vacuum pick-up pan 38 suspended therefrom by yokes 39 secured at their upper ends to the blocks 34. The lower ends of the yokes 39 are pivoted by pins 40 to U-shaped brackets 41 attached to the top of the vacuum pan 38. Thus, as the yokes 39 are swung laterally of the frame 25 by rotating the guide rods 32 and blocks 34, the pan 38 will swing downwardly through an arc but will stay horizontal at all times.

Figure 7:
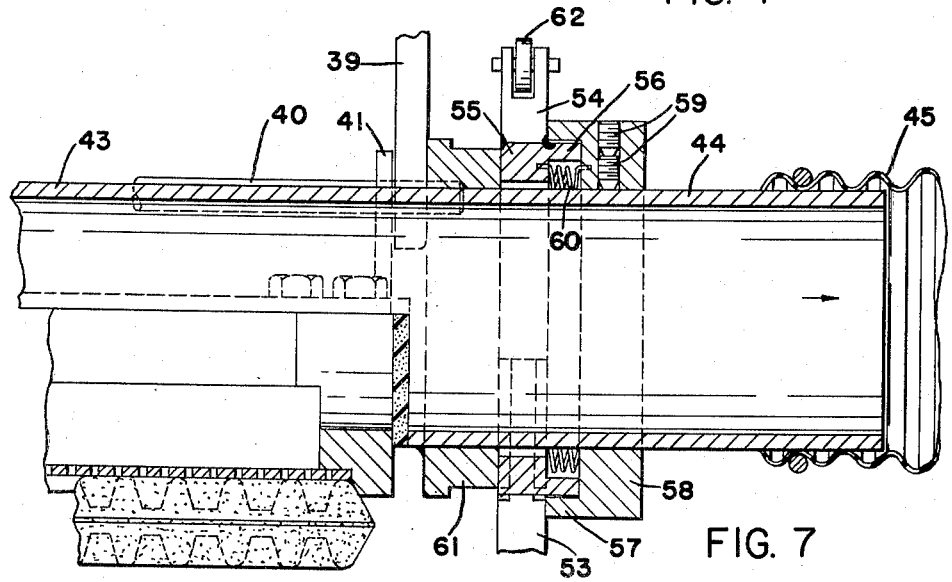
Fig. 7 is a further enlarged fragmentary section of the vacuum pan of the transfer carriage, as on line 7—7 of Fig. 5.

The vacuum pan 38 has a perforated plate 42 on its bottom surface having a size and shape designed to register with the four sections W of a griddle plate when positioned under the inner end of the frame 25. The perforations in plate 42 communicate with a vacuum chamber C within the pan 38, and chamber C is connected through a semi-cylindrical duct 43 with a pipe 44 to which a flexible hose 45 from a vacuum pump (not shown) is connected. Referring to Fig. 7, the duct 43 may be a continuation of pipe 44, with a gasket 46 sealing the joint between the pan and the lower part of the pipe 44.

Figure 6:
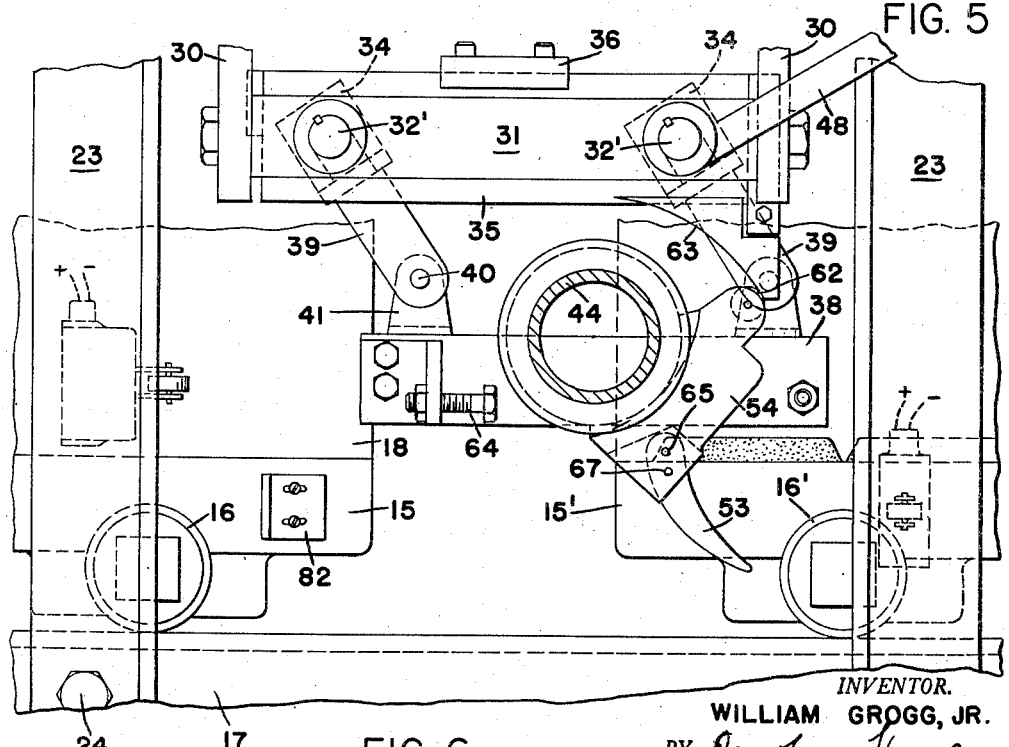
Fig. 6 is a similar view, showing the transfer carriage swung right and returned over the griddle conveyor in readiness to pick up the waffle cake from the next successive griddle.

When the carriage is positioned at the inner end of the frame 25, with the vacuum pan 38 directly above the path of the griddle plates 15, before the pick-up operation begins the vacuum pan is swung to the right as viewed in Fig. 6. The means for swinging the pan to the right and temporarily holding it in that position preferably comprises a link 48 secured to one of the round ends 32' of the guide rods 32 journaled in the outer transverse bar 31. The link 48 is pivoted at 49 to the piston rod 50 of a fluid cylinder 51 pivotally hung on a bracket 52 on the outer end of frame 25. Rotation of one of the guide rods 32 in a counter clockwise direction will rotate the blocks 34 and yokes 39 and swing the pan to the right.

Figure 5:
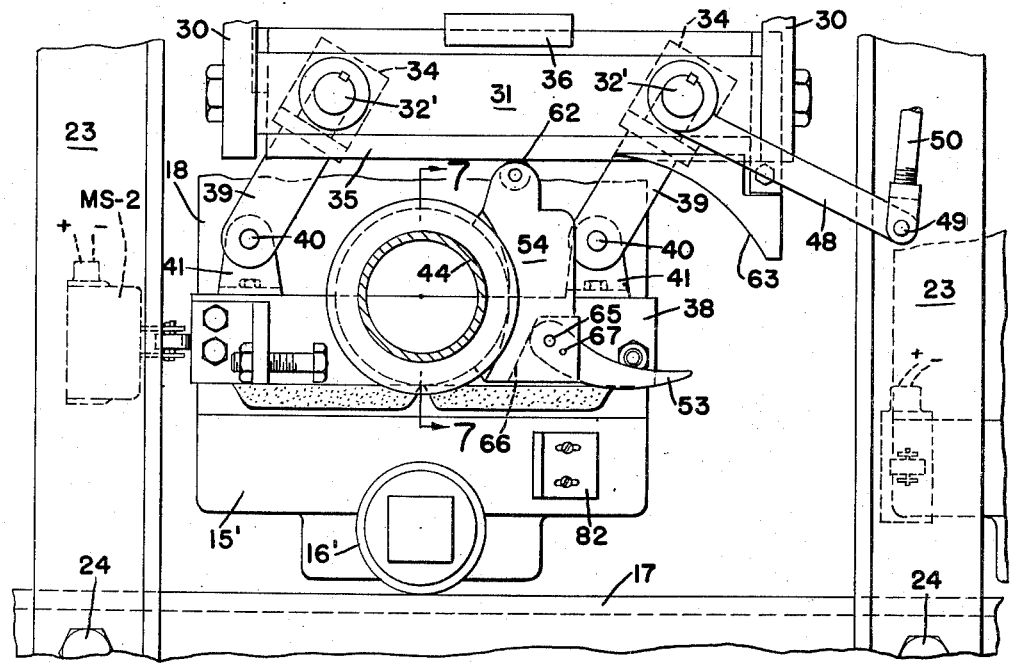
Fig. 5 is a similar view, showing the transfer carriage after it has moved over the trimmer conveyor in the position of Fig. 1.

Swiveled on the pipe 44 is a drag cam finger 53 for swinging down into the path of the roller 16' of the advancing griddle 15' when the pan 38 is swung to the right as in Fig. 6. This finger 53 is pivoted on a bracket 54 attached to a ring 55 rotatable on the pipe 44. As best shown in Fig. 7 the ring 55 has an annular flange 56 rotatable within the annular flange 57 on a retaining ring 58 secured to the pipe as by set screws 59. A coil spring 60 is interposed between the rings 55 and 58 and yieldingly urges the ring 55 in a counter clockwise direction toward the position of Fig. 5. A back-up ring 61 slidably abuts the inner face of ring 55 and is secured as by welding to the pipe 44.

The means for swinging the finger 53 downwardly against the bias of spring 60 preferably comprises a roller 62 journaled in the upper part of bracket 54 and adapted to engage a cam track plate 63 on the carriage frame as the pan swings right, causing the finger to swing downwardly to the position of Fig. 6 into the path of the advancing roller 16'. Thus, if piston rod 50 is released, when roller 16' engages the finger 53 it will swing the bracket 54 clockwise into abutment with the stop screw 64 on the pan, and then swing the pan 38 downwardly into register with the waffle cake section W' on its griddle, as shown in Fig. 3. During this time the vacuum chamber C is connected to the vacuum pump, and the suction through plate 42 lifts the waffle cake from the griddle against the plate.

Figure 4:
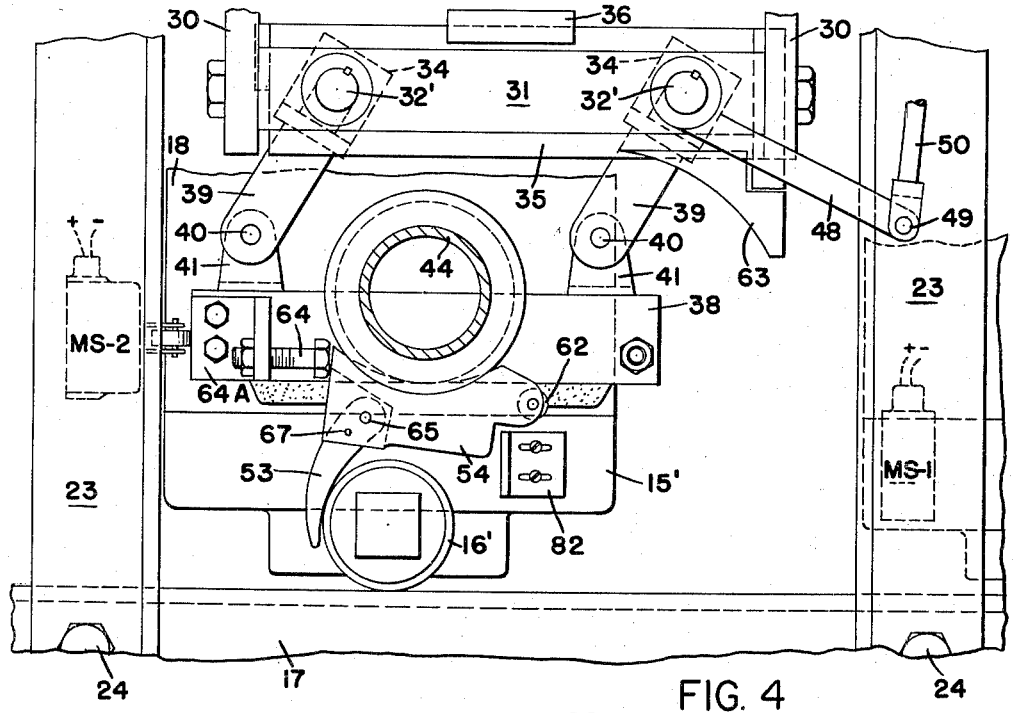
Fig. 4 is a fragmentary enlarged end elevation, showing the transfer carriage after it has picked up the cake and swung left.

As the roller 16' moves farther to the left, the pan swings in its arc to the left and slightly upwardly to raise the waffle cake slightly above the griddle. At this time the piston rod 50 of cylinder 51 is actuated to hold the pan in the position of Fig. 4. In this "locked left" position, the carriage is moved along the guide rods 32 to the outer end of the frame 25, where the vacuum pan 38 is directly over the trimmer belt 28, as in Fig. 1, and by cutting off the vacuum to the chamber C, the cake is dropped onto the belt. As the vacuum pan 38 moves away from the griddle 15', the drag finger 53 becomes disengaged from roller 16' and the spring 60 returns the bracket 54 and finger 53 counter clockwise to the position of Fig. 5.

After the cake is dropped onto belt 28, the piston rod 50 is actuated to swing the pan to the right and hold it in the "lock right" position of Fig. 6, as the carriage is returned to the inner end of the frame 25 over the path of the next advancing griddle 15. The speed of advancement of the griddle conveyor is coordinated to allow the carriage to return before the next successive griddle has advanced to the point of engaging the finger 53.

The drag finger 53 is preferably pivoted on a pin 65 in a pocket 66 in the lower end of bracket 54, and a shear pin 67 passes through the finger and the walls of the pocket for normally preventing the finger from rotating on its pivot. Should the carriage fail, for any reason, to move outward on the guide bars 32 at the proper time, the pin 67 will shear off and allow the griddle conveyor to advance past the finger 53 without damaging the carriage or any parts thereof.

The means for moving the carriage out and back along the frame 25 preferably comprises a chain 68 trained over a large sprocket 69 at the outer end of the frame 25 and over a smaller sprocket 70 at its inner end. A portion of the lower run of the chain is secured by spaced brackets 71 to the longitudinal bar 36 at the top of the carriage frame. The sprocket 70 is journaled in bearing brackets 72 secured to the transverse angle at the inner end of frame 25, and the shaft 73 of sprocket 69 is preferably journaled in bearing brackets 74 carried on the top of the frame near its outer end.

The sprocket 69 is rotated to reciprocate the chain 68 by means of a fluid cylinder 75 carried on top of the frame and having a piston rod 76 carrying a rack portion 77 on its outer end which meshes with a pinion 78 on the sprocket shaft 73. As shown in Figs. 1–3, the rack portion 77 is slidable between two spaced plates 80 straddling the pinion 78 and the rack meshes with the top of the pinion.

Figure 8:
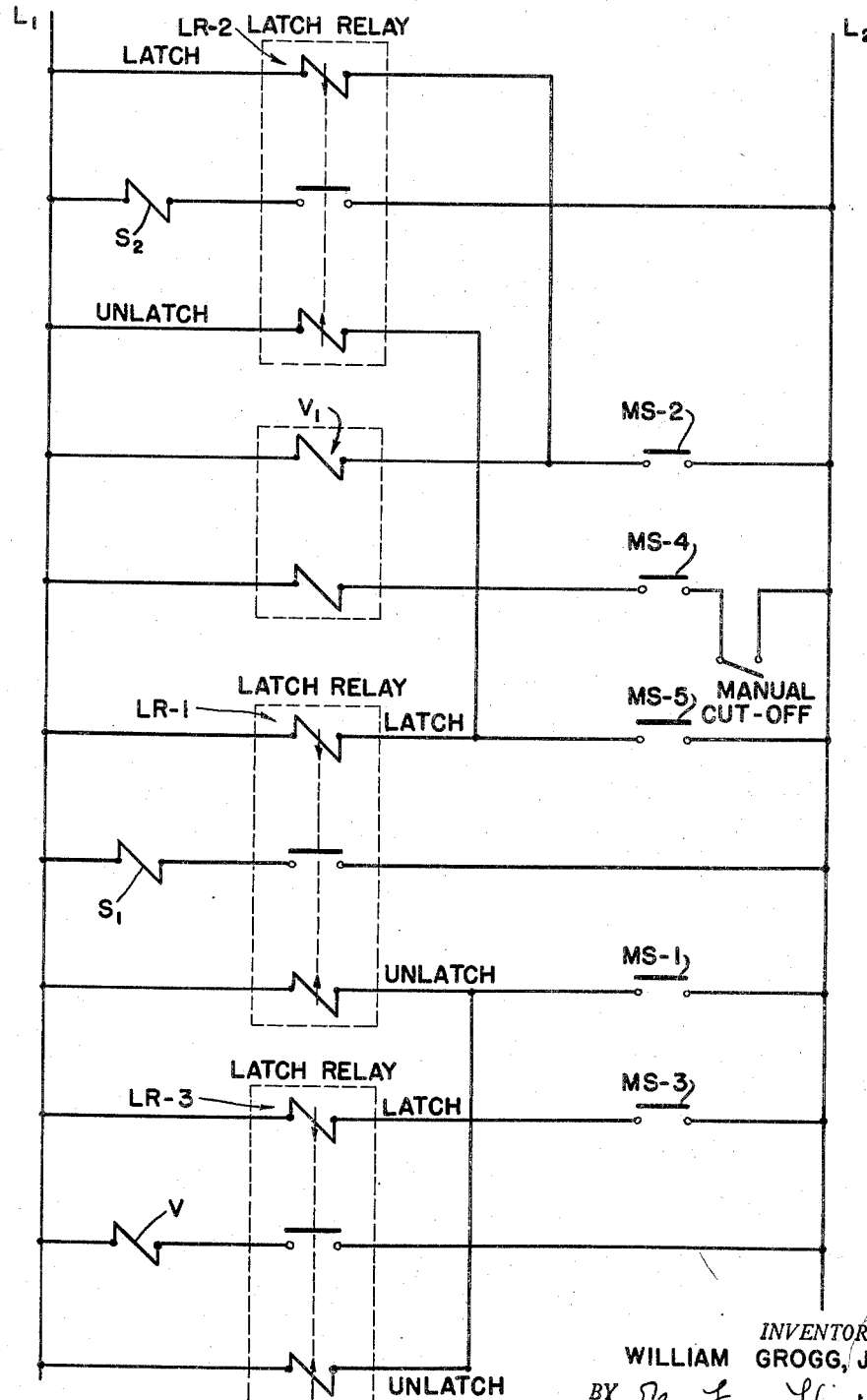
Fig. 8 is a diagram of the control circuit for automatic operation of the transfer mechanism.

In order to operate the transfer mechanism automatically, the fluid cylinders and vacuum supply are electrically controlled by suitable micro switches and latch relays shown schematically in Fig. 8. Fig. 2 shows in plan elevation the location of micro switches MS–1, MS–2, MS–3, MS–4, and MS–5. As the griddle 15' advances to the position of Fig. 6, MS–1 is actuated by a bracket 82 on the side of the griddle and through LR–1 the solenoid valve $S_1$ opens both ends of cylinder 51 to exhaust, releasing the piston rod 51 and the pan 38 from its "lock right" position. Simultaneously MS–1 acts through LR–3 to open valve V connecting the vacuum supply to the vacuum pan 38.

As the roller 16' pushes the pan from right to left, the pan swings down through its arc immediately above the waffle cake on the griddle 15' and the suction lifts the cake against the perforated plate 42. As the pan is swung farther to the left in the position of Fig. 4, the angle bracket 64A on the pan actuates MS–2 and through LR-2 the solenoid valve S₂ operates cylinder 51 and locks the pan in "lock left" position. Simultaneously, valve V₁ is energized to actuate the piston rod 76 of cylinder 75, which pulls the carriage 25 outwardly on the guide rods 32. As the drag finger 53 is pulled away from the roller 16' it is retracted by spring 60 in the manner previously described.

As the carriage approaches the outer end of the frame 25, it actuates MS-3 which through LR-3 closes the valve V, cutting off the vacuum supply and dropping the waffle cake onto the trimmer belt 28. At the outer end of the carriage travel, the carriage frame actuates MS-4, as indicated in Fig. 1, which energizes valve V₁ to reverse the piston rod 76 and pull the carriage inwardly, positioning the pan over the path of the advancing griddles. Enroute the carriage on its inward travel actuates MS-5, which through LR-1 and valve S₁, and LR-2 and valve S₂ operates the piston 50 to shift the pan 38 from the "lock left" position of Fig. 5 to the "lock right" position of Fig. 6. As the pan shifts to the right the roller 62 engages the cam track 63 and sets the drag finger 53 in the path of the next succeeding griddle roller 16 which moves forward to start another cycle of the transfer mechanism.

The improved transfer mechanism is compact and readily adapted to be associated and coordinated with a conventional type of griddle conveyor. The novel vacuum pan swings down over the successive griddles on the continuously moving conveyor, picks up the cakes therefrom, and transfers them to a laterally spaced location or take-away conveyor without causing any breakage or damage to the cakes.

What is claimed is:

1. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, means mounting said pan on said carriage for swinging transversely of said frame substantially into contact with a cake on a griddle passing under said frame, means for moving said carriage back and forth on said frame, and means on the frame for swinging said pan.

2. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, means mounting said pan on said carriage for swinging transversely of said frame substantially into contact with a cake on a griddle passing under said frame, means on said pan for engagement by successive griddles to swing the pan forwardly of the conveyor, means for moving said carriage back and forth on said frame, and means on the frame for swinging the pan rearwardly of the conveyor to starting position.

3. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, a flexible conduit connected to said pan to supply vacuum thereto, means for controlling the vacuum supply to said conduit, means mounting said pan on said carriage for swinging transversely of said frame substantially into contact with a cake on a griddle passing under said frame, means for moving said carriage back and forth on said frame, and means on the frame for swinging said pan.

4. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, a flexible conduit connected to said pan to supply vacuum thereto, means for controlling the vacuum supply to said conduit, means mounting said pan on said carriage for swinging transversely of said frame substantially into contact with a cake on a griddle passing under said frame, means on said pan for engagement by successive griddles to swing the pan forwardly of the conveyor, means for moving said carriage back and forth on said frame, and means on the frame for swinging the pan rearwardly of the conveyor to starting position.

5. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, means mounting said pan on said carriage for swinging arcuately forwardly of the conveyor substantially into contact with a cake on a griddle, means for connecting a source of vacuum to said pan to lift said cake from said griddle, means for moving said carriage outwardly and inwardly on said frame, means for shutting off the vacuum supply to drop the cake when the carriage reaches the outer end of said frame, and means on said frame for swinging the pan rearwardly of the conveyor to starting position.

6. Apparatus for transferring battercakes from successive griddles on a moving conveyor to an unloading station, including a frame having one end above the conveyor and extending laterally outward therefrom to the unloading station, a carriage mounted on the frame for movement lengthwise thereof, a vacuum lift pan adapted for registry with said griddles as they pass under the frame, means mounting said pan on said carriage for swinging arcuately forwardly of the conveyor substantially into contact with a cake on a griddle, means on said pan for engagement by successive griddles to swing the pan forwardly of the conveyor, means for connecting a source of vacuum to said pan to lift said cake from said griddle, means for moving said carriage outwardly and inwardly on said frame, means for shutting off the vacuum supply to drop the cake when the carriage reaches the outer end of said frame, and means on said frame for swinging the pan rearwardly of the conveyor to starting position.

7. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, a finger mounted on said pan for movement into a position to be engaged by each of said griddles for swinging said pan forwardly over said griddle to lift a cake therefrom, means on said frame for swinging said pan rearwardly of said conveyor, means on said carriage to move said finger into griddle-engaging position on swinging the pan rearwardly, and spring means to retract said finger when the carriage moves laterally away from said griddles.

8. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, a finger mounted on said pan for movement into a position to be engaged by each of said griddles for swinging said pan forwardly over said griddle to lift a cake therefrom, means for moving said carriage outwardly and inwardly on said frame, means on said frame for swinging said pan rearwardly of the conveyor during its movement inwardly of the frame, means on said carriage to move said finger into griddle-engaging position on swinging the pan rearwardly, and means to retract said finger when the carriage moves laterally away from said griddles.

9. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, a finger mounted on said pan for movement into a position to be engaged by each of said griddles for swinging said pan forwardly over said griddle, means for connecting a source of vacuum to said pan to lift a cake therefrom, means for moving said carriage outwardly and inwardly on said frame, means for shutting off the vacuum supply to drop the cake when the carriage reaches the outer end of said frame, means on said frame for swinging said pan rearwardly of the conveyor during its movement inwardly of the frame, means on said carriage to move said finger into griddle-engaging position on swinging the pan rearwardly, and means to retract said finger when the carriage moves laterally away from said griddles.

10. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as the pass under said frame, means mounting said pan on said carriage for swinging arcuately downward over the conveyor, cam means mounted on said pan for movement into a position to be engaged by each of said griddles for swinging said pan forwardly over said griddle to lift a cake therefrom, means on said frame for swinging said pan rearwardly of said conveyor, means on said carriage to move said cam means into griddle-engaging position on swinging the pan rearwardly, and spring means to retract said cam means when the carriage moves laterally away from said griddles.

11. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, cam means mounted on said pan for movement into a position to be engaged by each of said griddles for swinging said pan forwardly over said griddles to lift a cake therefrom, means for moving said carriage outwardly and inwardly on said frame, means on said frame for swinging said pan rearwardly of the conveyor during its movement inwardly of the frame, means on said carriage to move said cam means into griddle-engaging position on swinging the pan rearwardly, and means to retract said cam means when the carriage moves laterally away from said griddles.

12. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, cam means mounted on said pan for movement into a position to be engaged by each of said griddles for swinging said pan forwardly over said griddle, means for connecting a source of vacuum to said pan to lift a cake therefrom, means for moving said carriage outwardly and inwardly on said frame, means for shutting off the vacuum supply to drop the cake when the carriage reaches the outer end of said frame, means on said frame for swinging said pan rearwardly of the conveyor during its movement inwardly of the frame, means on said carriage to move said cam means into griddle-engaging position on swinging the pan rearwardly, and means to retract said cam means when the carriage moves laterally away from said griddles.

13. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, means on said pan for engagement by an advancing griddle to swing the pan forwardly over the griddle, means actuated by the advancing griddle to connect a source of vacuum to the pan to lift a cake off said griddle, means actuated by the forward swing of said pan to move said carriage outwardly to said unloading station, means to shut off the vacuum when the pan reaches said station and to move the carriage inwardly, and means to swing said pan rearwardly as the carriage moves inwardly to starting position.

14. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, means on said pan for engagement by an advancing griddle to swing the pan forwardly over the griddle, means actuated by the advancing griddle to connect a source of vacuum to the pan to lift a cake off said griddle, means actuated by the forward swing of said pan to move said carriage outwardly to said unloading station, means to shut the vacuum off when the pan reaches said station to drop the cake, means to then move the carriage inwardly, and means to swing said pan rearwardly as the carriage moves inwardly to starting position.

15. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, cam means mounted on said pan for movement into a position to be engaged by an advancing griddle for swinging said pan forwardly over the griddle, means to connect a source of vacuum to the forwardly swinging pan to lift a cake off the griddle, means to move said carriage with the removed cake outwardly to said unloading station, means to retract said cam means as the carriage leaves the griddle, means to shut off the vacuum when the pan reaches said station and to move the carriage inwardly, means to swing the pan rearwardly, and means on said carriage to move said cam means to griddle-engaging position on swinging the pan rearwardly.

16. Apparatus for transferring battercakes from successive griddles on a moving conveyor to an unloading station, including a frame having one end above the conveyor and extending laterally outward therefrom to the unloading station, a carriage mounted on the frame for movement outwardly and inwardly on the frame, a vacuum lift pan adapted for registry with successive griddles as they pass under said frame, means mounting said pan on said carriage for swinging arcuately downward over the conveyor, cam means mounted on said pan for movement into a position to be engaged by an advancing griddle for swinging said pan forwardly over the griddle, means actuated by the advancing griddle to connect a source of vacuum to the pan to lift a cake off the griddle, means actuated by the forward swing of the pan to move said carriage with the removed cake to said unloading station, means to retract said cam means as he carriage leaves the griddle, means to shut off the vacuum when the pan reaches said station and to move the carriage inwardly, means to swing the pan rearwardly as the carriage moves inwardly, and means actuated by said rearwardly swinging movement of said pan to move said cam means to griddle-engaging position.

No references cited.